(12) United States Patent
Erickson et al.

(10) Patent No.: US 7,096,594 B2
(45) Date of Patent: Aug. 29, 2006

(54) ALIGNMENT DEVICE FOR A COMPUTER CHASSIS

(75) Inventors: Vernon D. Erickson, Dakota Dunes, SD (US); David R. Davis, Jefferson, SD (US); Kevin Alan Patin, El Paso, TX (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 10/611,116

(22) Filed: Jun. 30, 2003

(65) Prior Publication Data

US 2004/0261281 A1    Dec. 30, 2004

(51) Int. Cl.
*G01D 21/00*    (2006.01)

(52) U.S. Cl. .............................. 33/645; 33/567; 29/759

(58) Field of Classification Search .................. 33/613, 33/645, 567; 29/759
See application file for complete search history.

(56) References Cited

U.S. PATENT DOCUMENTS

| | | | | |
|---|---|---|---|---|
| 2,536,401 A | * | 1/1951 | Victor | 33/567 |
| 3,771,232 A | * | 11/1973 | Specht | 33/567 |
| 5,671,538 A | * | 9/1997 | Lautenschlager | 33/645 |
| 5,709,024 A | * | 1/1998 | Kugo | 29/759 |
| 6,108,923 A | * | 8/2000 | Polkhovskiy | 33/613 |
| 6,463,653 B1 | * | 10/2002 | Gamel et al. | 29/759 |

* cited by examiner

*Primary Examiner*—Christopher W. Fulton
(74) *Attorney, Agent, or Firm*—Robert Zielinski; Wolf, Block LLP

(57) ABSTRACT

An alignment device eases installation of computer assemblies, such as drives, into a corresponding chassis. The alignment device includes one or more planar areas located and oriented so as to be substantially alignable with one or more computer assemblies to be mounted to the chassis. The computer assembly has a user-visible surface which is moved until it is co-planar with a corresponding planar area of the alignment device. When positioned in this co-planar configuration, the computer assembly is correctly positioned relative to the chassis to be mounted thereto. The alignment device can be located on the computer chassis between mounting locations for two computer assemblies, such as a 5¼-inch drive and a 3½-inch drive and, in such application, can be provided with two planar areas at two different heights, one corresponding to the alignment position for one of the computer assemblies, the other corresponding to the alignment position for the other of the computer assemblies.

20 Claims, 1 Drawing Sheet

ALIGNMENT DEVICE FOR A COMPUTER CHASSIS

FIELD OF THE INVENTION

This invention relates to computer hardware and, more particularly, computers having computer chassis therein, and drives or other computer assemblies to be mounted to such computer chassis.

BACKGROUND OF THE INVENTION

Information handling systems (referred to generally herein as "computers") exist in many forms, from pocket-sized devices, personal digital assistants, cellular phones, and the like, to personal computers, servers, rack-mounted systems, and mainframes. The manufacture and assembly of such computers generally involves the mounting of computer hardware, computer devices, modular components and the like (referred to generally as "computer assemblies") in the computer. Personal computers (including notebooks, desktops and laptops), servers, and the like generally include one or more computer assemblies, such as computer drives, for storing or accessing information. Computer drives include so-called hard drives, as well as 5¼-inch drives for CD-ROMS and digital versatile disks (DVD), 3½-inch drives for floppy discs, and the like. These computer assemblies are typically added to increase the functionality of the computer, as may be desired by a user.

The installation of computer assemblies, including the drives referred to above, may sometimes be time-consuming or suffer from various other drawbacks and disadvantages. For example, drives and other user-accessible computer assemblies generally need to be mounted relative to the computer chassis at a certain, predetermined position so that the user-visible part of the drive is in the right position relative to the rest of the computer. So, for example, if the computer has a bezel, face-plate, or other exterior surface accessed by the user to operate the computer, it is generally desirable for the drives or other user-accessible computer assemblies to be mounted to the computer chassis to be aligned or otherwise correctly positioned relative to such exterior surface of the computer.

The correct positioning of drives and other computer assemblies relative to the chassis to which they are mounted is also complicated when the assembler cannot see the mounting holes typically found in such drives to line them up with the corresponding locations on the chassis. Still further difficulties may arise in cases where small screws or other fasteners are required to be inserted in correspondingly small mounting holes on the drives, again such process being even more difficult with limited or no visibility to whether the mounting holes of the drive are correctly positioned relative to the computer chassis.

Therefore, it would be desirable to provide a device or method for easing the installation of a computer assembly, such as a drive, into a corresponding computer chassis.

SUMMARY OF THE INVENTION

In accordance with one aspect of the present invention, an alignment device makes it easier to install a computer assembly into a corresponding computer chassis. In one version of the invention, the alignment device is in the form of an extender. The extender is mounted to the computer chassis and configured to indicate one or more positions relative to the chassis. In this way, when the assembly is installed, the user-visible surface of the assembly is aligned with a corresponding portion of the extender.

In a second aspect of the invention, the portion of the extender to be aligned with the computer assembly is in the form of a planar area. The planar area is oriented so that, when it is substantially aligned with the user-visible surface of the assembly being mounted, the assembly is correctly positioned to the chassis for proper installation.

In a third aspect of the invention, the extender is in the form of an alignment block extending outwardly from the chassis. The alignment block has a top surface with two steps formed therein. The two steps correspond to the alignment positions of two drives to be mounted to the chassis.

In yet another aspect of the present invention, a computer includes two drives with user-visible surfaces, and a chassis to which the two drives are to be mounted. The chassis has a pair of apertures for receiving the drives therein and mounting brackets associated with each of the apertures. An alignment device is mounted to the chassis between the apertures and has a pair of planar areas spaced from the chassis. Each planar area is located and oriented to align a corresponding one of the drives to indicate the correct position of the drive for installation.

It is to be understood that both the foregoing general description, as well as the following detailed description are exemplary and explanatory only, and are not restrictive of the invention as claimed. The accompanying drawings and the description illustrate one or more embodiments of the invention, and it is understood that the invention is not limited to the preferred embodiments depicted in the drawings or described herein, but rather it is defined by the claims appended hereto and equivalent structures.

DETAILED DESCRIPTION OF THE INVENTION

Figure 1:
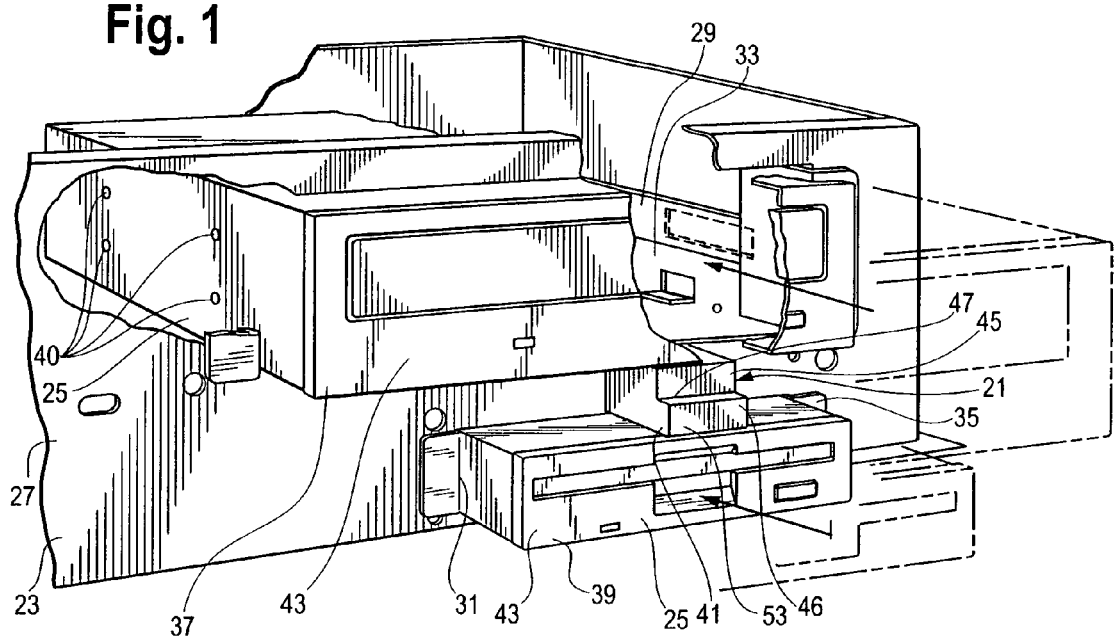
FIGS. 1 and 2 are perspective views of one preferred embodiment of the present invention.

Referring now the drawings, and in particular to FIG. 1, an alignment device 21 is operatively associated with a computer chassis 23, meaning that alignment device 21 is located relative to the chassis 23 so as to indicate the preferred or correct position of one or more computer assemblies 25 relative to chassis 23. In this preferred embodiment, chassis 23 is for a personal computer and includes a front plate 27 with two apertures 29, 31 sized to receive two, corresponding computer assemblies 25 therein. Chassis 23 includes portions defining assembling mounting brackets 33, 35 for securing computer assemblies extending inwardly from corresponding apertures 29, 31. One computer assembly 25 comprises a 5¼-inch drive 37, such as is suitable for CD-ROMs, rewritable CDs, DVDs and the like. Aperture 29 is sized so that the 5¼-inch drive can be received therethrough, and corresponding assembly mounting bracket 33 is configured so that the 5¼-inch drive 37 can be secured thereto by suitable means.

The second computer assembly 25 comprises a 3½-inch "floppy" drive 39. Aperture 31 is sized to receive the 3½-inch floppy drive 39 therein, and corresponding mounting bracket 35 is configured to secure drive 39 thereto through suitable means.

Drives 37, 39 include mounting holes 40 which need to be correctly positioned relative to corresponding mounting structures on mounting brackets 33, 35, so that drives 37, 39 can be secured to chassis 23. In other words, in order for drives 37, 39 to be installed in or mounted to chassis 23, it is necessary to position drives 37, 39 correctly relative chassis 23, with "correctly" meaning in a position to be secured to chassis 23.

Alignment device 21 eases such installation of assemblies 25 relative to computer chassis 23. In this preferred embodiment, alignment device 21 comprises an extender 41 with a base mounted by any suitable means to a location on chassis 23. Extender 41 is configured to indicate at least one position relative to chassis 23 such that, when the corresponding assembly has been installed in the correct position, user-visible surface 43 of computer assembly 25 is aligned with a corresponding portion of extender 41. More particularly, the portion of extender 41 which indicates the correct installation position is an outwardly facing surface 47 with at least one, and preferably two planar areas 45, 46 defined on outwardly facing surface 47.

Planar areas 45, 46 are oriented so that when assemblies 25 are inserted into corresponding apertures and slides in direction shown by the arrows A, user-visible surfaces 43 can be substantially aligned with corresponding planar areas 45, 46. The planar areas 45, 46 have been located a distance from front plate 27 of chassis 23 so that when the drives have been positioned with their user-visible surfaces 43 substantially aligned with corresponding planar areas 45, 46, the drives are in the correct position for mounting to chassis 23 and, more particularly, to assembly mounting brackets 33, 35 thereof.

Figure 2:
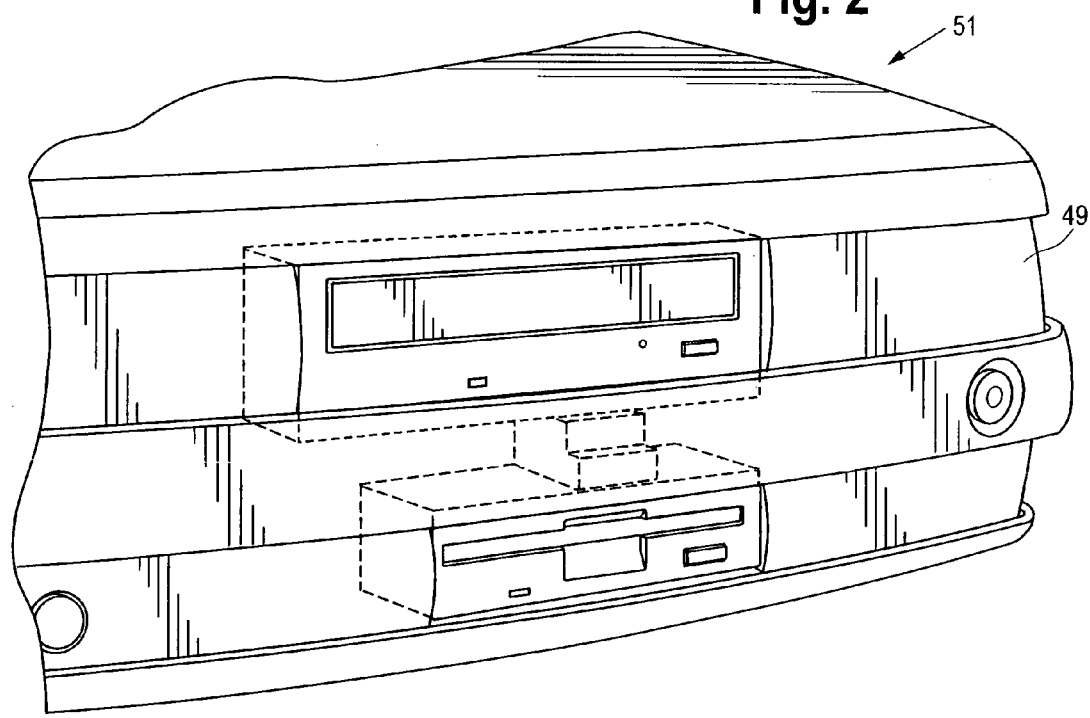

Outwardly facing surface 47, in this embodiment, is in the form of a pair of steps, with the planar area 45 comprising the "lower" step, and the planar area 46 comprising the "upper" step. Again, the particular heights or distances of planar areas 45, 46 from chassis 23 are chosen for the particular computer assemblies 25 to be installed in chassis 23, the location of the mounting holes in such assemblies, the configuration of the chassis 23 itself, and the location or configuration of the faceplate or bezel 49 which surrounds user-visible surfaces 43 in the completed computer 51 (FIG. 2).

Planar areas 45, 46 are located in operative proximity to the drives 37, 39 with which they are to be aligned. By "operative proximity," it is meant that they are positioned on chassis 23 so that, in whatever way drives 37, 39 are to be installed, the user-visible surfaces 43 can be visibly perceived by an assembler or user as aligned with corresponding planar areas. In the illustrated embodiment, planar areas 45, 46 are substantially adjacent to apertures 29, 31, respectively. In this way, when drives 37, 39 are correctly positioned, the planar area 45 is substantially co-planar with the user-visible surface 43 of the 5¼-inch drive 37 and, similarly, planar area 46 is substantially co-planar with the user-visible surface of 3½-inch floppy drive 39.

The co-planar structures formed by the alignment of planar areas 45, 46 with their corresponding user-visible surfaces of drives 37, 39 provide not only a visual indication of correct positioning, but also a tactile indication to the assembler or user, under appropriate circumstances. Thus, if an assembler or user wishes, he or she can feel the small gap where the edges of planar areas 45, 46 are against opposing portions of drives 37, 39. In this way, he or she can feel whether the opposing edges are co-planar with each other, in which case the drives have been correctly positioned, or whether there is a step or discontinuity between the opposing edges, in which case the drives are not quite correctly positioned.

Alignment device 21 is preferably located relative to the one or more assemblies 25 for which it is to be used in such a way that the user-visible surface or surfaces 43 can be aligned irrespective of the length or depth of assembly or assemblies 25. With reference to the embodiment of FIGS. 1 and 2, drives 37, 39, although generally having standard widths, often have lengths which vary on the make, model, or type of drive. Thus, by locating extender 41 adjacent to drives 37, 39, rather than behind such drives, the corresponding portions of extender 41 can be aligned with user-visible surfaces 43 to indicate the correct position of drives 37, 39, irrespective of the depths of such drives. In a sense, then, alignment device 21 is located to indicate the correct depth to which one or more assemblies 25 should be inserted into apertures 29, 31 formed in front plate 27 of chassis 23.

Assembly mounting brackets 33, 35 are preferably drive mounting brackets which engage corresponding sides of drives 37, 39, preferably at mounting holes 40 defined in such drives. It is to be understood that any of a variety of fastening systems and associated methods are suitable for mounting assemblies 25 relative to assembly mounting brackets 33, 35, and the operation of alignment device 21 is substantially independent of the means chosen for mounting assemblies 25, or the exact form of mounting brackets 35, 37.

In view of the foregoing, extender 41 is calibrated in length so that, whatever configuration of drives, chassis, or mounting brackets and associated fastening systems are used, when drives 37, 39 are being installed, their user-visible surfaces 43 are alignable with corresponding portions of extender 41 to indicate correct positioning of such drives.

It is often the case that certain types of computer drives have their mounting holes 40 spaced at generally standard distances from their user-visible surfaces 43. In such circumstances, the heights of planar areas 45, 46 relative to front plate 27 are selected so that the distances between planar areas 45, 46 and the mounting apparatus of brackets 33, 35 correspond to such generally standard distances.

Alignment device 21 is generally permanently secured to chassis 23 but may be, optionally, designed to be removed once it has been used to correctly position assemblies 25 relative to chassis 23.

Alignment device 21 is shown in this embodiment in the form of an alignment block with longitudinal sides extending orthogonally from front plate 27 of chassis 23, and outwardly facing surface 47 comprising the upper or top surface 53 of the alignment block. Alignment device 21 in the form of an alignment block is preferably formed as a piece of polymeric material, although other materials are likewise suitable. For example, alignment device 21 can be formed from metal or sheet metal suitably bent to create outwardly facing surface 47 and corresponding planar areas 45, 46.

Extender 41 is preferably located adjacent to drives 37, 39, as mentioned previously, and more preferably located between and adjacent to apertures 29, 31.

Although alignment device 21 is illustrated in conjunction with a computer with 5¼ inch and 3½ inch drives, alignment device 21 is likewise suitable for use with hard drives, or for any of the myriad computer assemblies with user-visible surfaces which are adapted to be mounted to a corresponding computer chassis. Likewise, although alignment device 21 has been shown in the context of a chassis for a desk top computer, it is likewise usable for any of the myriad types of information handling systems or computers available today in conjunction with the components or computer assemblies mounted to such computer systems.

Alignment device 21 has been shown to indicate two alignment positions for two corresponding assemblies 25. It should be appreciated, however, that alignment device 21 can be configured to indicate a single alignment position for either one or more assemblies 25.

As a further alternative, alignment device 21 can be suitably configured to indicate more than two alignment positions. Thus, while alignment device 21 makes use of planar areas for purposes of indicating correct alignment position, it is within the scope of the invention to use alternate structures or indicators of correct positioning, including hash marks, detentes, ridges, and the like, any of which are positioned in operative proximity to the corresponding assembly 25 to be aligned.

Figure 3:
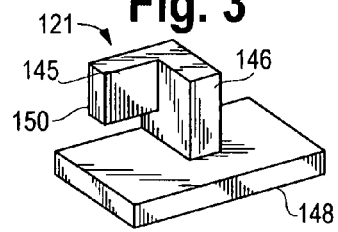
FIGS. 3–5 show alternative embodiments of the alignment device of the present invention.
Figure 4:
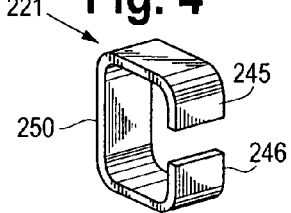
Figure 5:
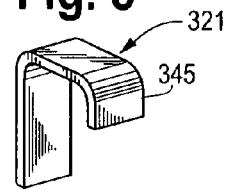

FIGS. 3–5 illustrate some of the many variations to alignment device 21 contemplated by the present invention. Referring to FIG. 3, alignment device 121 indicates three alignment positions with three corresponding planar areas 145, 146, 148. Alignment device 121 is secured at its rear surface 150 to a corresponding location on a computer chassis. If alignment device 121 is used between two potential mounting locations on a chassis, the user or assembler may choose which of the planar areas to align corresponding computer assemblies with. Suitable information or instructions may be provided to the assembler to know which of assemblies 25 are to be aligned with which of the corresponding planar areas 145, 146, and 148.

Referring now to FIG. 4, alignment device 221 is formed of sheet metal suitably bent to provide to planar areas 245, 246, at two different, respective heights. As in the case of alignment device 121 of FIG. 3, alignment device 221 of FIG. 4 is designed to be secured in an appropriate portion of a chassis at rear surface 250. In this way, planar areas 245, 246 extend outwardly from rear surface 250 of alignment device 221 so as to be oriented and positionable adjacent to user-visible surfaces of assemblies 25 (FIGS. 1 and 2).

Referring now to FIG. 5, an alignment device 321 is configured to indicate a single alignment position by providing a single planar area 345. As with the previous embodiments, alignment device 321 is capable of being mounted to a chassis in operative proximity to, and preferably adjacent to, corresponding computer assemblies 25 to be mounted to such chassis. When planar area 345 is adjacent to computer assembly 25, the user-visible surface 43 can be made co-planar with planar area 345, giving the assembler not only a visual indication of correct positioning but also a tactile indication if the users finger is placed between the opposing edges of alignment device 321 and the opposing portion of computer assembly 25 being installed adjacent to alignment device 321.

Having described the various features and structures of alignment device 21 and its associated computer, the use or operation of the invention is readily apparent. An assembler, or even an end user wishing to install computer assemblies 25, inserts them into corresponding apertures 29, 31. In the illustrated embodiment, 5¼-inch drive 37 is slid in the direction of arrow A into aperture 29. The body of drive 37 is received behind aperture 29 and is positioned in operative proximity to corresponding mounting brackets 33, to which it will be secured when correctly positioned. The insertion of drive 37 continues until its user-visible surface 43 is substantially aligned with extender 41. More particularly, the user-visible surface 43 of drive 37 is moved until it is co-planar with planar area 45 which is adjacent to drive 37. This adjacent configuration means that an assembler can place his or her thumb or finger along the opposing edges between planar area 45 and user-visible surface 43 to feel when these two surfaces are co-planar.

The above-described installation procedure is repeated if there is a second computer assembly 25, such as the 3½-inch floppy drive 39 in the illustrated embodiment. In the case of drive 39, its user-visible surface 43 is moved until it is co-planar with planar area 46 of extender 41.

Since the respective heights of planar area 45, 46 have been calibrated to indicate the correct positioning of drives 37, 39 relative to chassis 23, mounting holes 40 of the drives are in the correct position to be secured relative to mounting brackets 33, 35, respectively, by any suitable means.

In addition to the advantages apparent from the foregoing description, a computer equipped with the alignment device of the present invention can have computer assemblies secured to its chassis without reference to the computer faceplate, bezel, or other indicators.

As an additional advantage, the alignment device of the present invention can be used with drives or other computer assemblies, and their corresponding chassis, irrespective of the depths of such computer assemblies.

The alignment device eases installation of one or more computer assemblies by providing not only a visual indication of correct positioning but also, optionally, a tactile one.

The present invention may be embodied in other specific forms without departing from the spirit or essential attributes thereof and, accordingly, reference should be made to the appended claims, and their equivalents, rather than to the foregoing specification, as indicating the scope of the invention.

What is claimed is:

1. A computer, comprising at least one computer assembly, a chassis with an assembly mounting bracket for securing the assembly relative to the chassis, and an alignment device operatively associated with the chassis for correctly positioning the assembly relative to the assembly mounting bracket, wherein the alignment device comprises an extender secured to the chassis and extending outwardly therefrom, the computer assembly having a user-visible surface, the extender having a planar area oriented so that aligning the planar area with the user-visible surface of the assembly correctly positions the assembly relative to the chassis.

2. The computer of claim 1, wherein the assembly comprises a drive, and wherein the assembly mounting bracket comprises a drive mounting bracket configured to have the drive secured thereto.

3. The computer of claim 2, wherein the drive has a corresponding depth, and wherein the drive mounting bracket is configured to receive the drive therein irrespective of the corresponding depth of the drive.

4. The computer of claim 2, wherein the drive is selected from the group consisting of a 5¼" drive, a 3½", and a hard drive.

5. The computer of claim 1, wherein the extender comprises an alignment block with an upper surface, and the planar area for indicating alignment is located on the upper surface of the alignment block.

6. The computer of claim 1, further comprising an aperture defined in the chassis and sized to receive the assembly therein, the alignment device located to indicate the correct depth to which the assembly should be inserted into the aperture.

7. The computer of claim 1, further comprising two computer assemblies and two apertures defined in the chassis, each of the apertures sized to receive a corresponding one of the assemblies therein, the alignment device located to have a portion in operative proximity to each of the two apertures.

8. The computer of claim 7, wherein the chassis has a plate and the two apertures are defined in the plate.

9. The computer of claim 8, wherein the alignment device is located between the two apertures.

10. A computer, comprising at least one computer assembly, a chassis with an assembly mounting bracket for securing the assembly relative to the chassis, and an alignment device operatively associated with the chassis for correctly positioning the assembly relative to the assembly mounting bracket, an aperture defined in the chassis and sized to receive the assembly therein, the alignment device located to indicate the correct depth to which the assembly should be inserted into the aperture, wherein the chassis includes a plate, the aperture is defined in the plate, and the mounting bracket is located behind the plate, the assembly comprising a drive with a user-visible surface, the alignment device comprising an extender mounted to extend outwardly from the plate and calibrated in length so that, when the drive is being installed, the user-visible surface of the drive is aligned with a corresponding portion of the extender.

11. The computer of claim 10, wherein the corresponding portion of the extender comprises at least one planar area oriented so that the user-visible surface is substantially aligned with the planar area when the drive has been correctly positioned, wherein the drive has a body extending from the user-visible surface by a corresponding depth to the make, model, or type of the drive, wherein the aperture, the extender, and the assembly mounting bracket are configured so that, irrespective of the depth of the drive, the drive body can be inserted through the aperture until the user-visible surface is aligned with the planar area of the extender.

12. The computer of claim 11, further comprising a bezel secured in front of the plate of the chassis, and wherein the planar area is located at a position above the plate so that the user-visible surface, when aligned with the planar area, is positioned correctly in relation to the bezel.

13. A computer comprising:
two computer assemblies:
a chassis with an assembly mounting bracket for securing the computer assemblies relative to the chassis;
an alignment device fixably mounted to the chassis for correctly positioning the computer assemblies relative to the assembly mounting bracket;
two apertures defined in the chassis, each of the apertures sized to receive a corresponding one of the computer assemblies therein, the alignment device located to have a portion in operative proximity to each of the two apertures, wherein the chassis has a plate and the two apertures are defined in the plate, wherein the alignment device is located between the two apertures, and wherein the computer assemblies include respective, user-visible surfaces wherein the alignment device comprises an extender configured to indicate the position of at least one of the user-visible surfaces relative to the chassis.

14. The computer of claim 13, wherein the extender includes at least one planar area oriented so that at least one of the user-visible surfaces is substantially aligned with the planar area when the corresponding computer assembly is installed.

15. The computer of claim 14, wherein the extender includes at least two planar areas, one located at a first height relative to the chassis to align one of the computer assemblies, and the other located at a second height relative to the chassis to align the other of the computer assemblies.

16. The computer of claim 15, wherein the planar areas comprise outwardly facing surfaces and are located relative to the apertures so that the planar areas are substantially next to respective, user-visible surfaces when the assemblies are received in the apertures to the correct depths.

17. A computer, comprising;
at least one drive with a user-visible surface;
a chassis; and
an alignment device operatively associated with the chassis for correctly positioning the drive relative to the chassis for correct installation therein;
wherein the alignment device has at least one planar area located at a height relative to the chassis, the planar area being located on the chassis so as to be adjacent to a corresponding portion of the drive during installation, the planar area being oriented so that the user-visible surface of the drive can be positioned to be co-planar with the corresponding planar area to indicate correct positioning of the drive relative to the chassis.

18. The computer of claim 17, wherein the chassis includes a drive mounting bracket for securing the drive relative to the chassis.

19. The computer claim 17, comprising at least two of the drives, wherein the alignment device includes at least two planar areas located at two heights corresponding to the correct positioning of the two drives, respectively.

20. A method of aligning a computer assembly relative to a computer chassis, the method comprising the steps of:
providing an aperture defined in the computer chassis, providing an alignment device, providing an assembly mounting bracket operatively associated with the aperture, and providing the computer assembly with a user-visible surface;
inserting the assembly through the aperture until the user-visible surface is aligned with a corresponding portion of the alignment device; and
accomplishing the alignment step above irrespective of the depth of the computer assembly.

* * * * *